3,217,702
RADIATION COLLECTING DEVICES
Wendell S. Miller, 1341 Comstock Ave.,
Los Angeles, Calif.
Filed Aug. 3, 1962, Ser. No. 214,595
12 Claims. (Cl. 126—270)

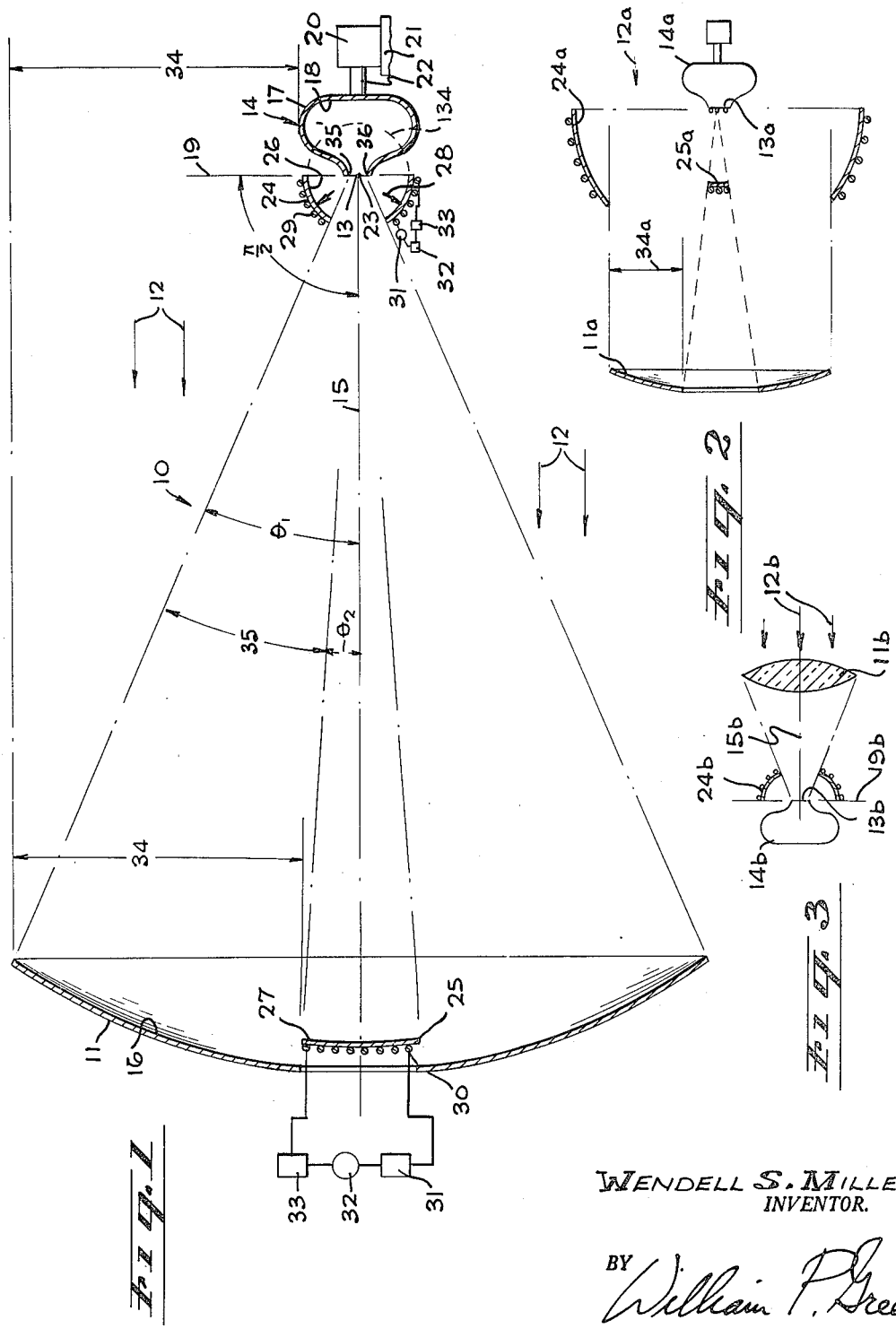

This invention relates to improved radiation collecting apparatus, adapted to collect energy from a source, such as the sun, or from any other electromagnetic radiation source.

The general object of the invention is to provide a solar furnace or other radiation collecting unit which is capable of conserving the radiation present in a manner not possible in prior similar structures, and as a result greatly increasing the efficiency with which a particular amount of radiation is handled, to thereby maximize the effectiveness of the overall collector structure. As a result of the increased efficiency which is attained by a unit embodying the invention, the radiation concentrations achievable utilizing a certain size primary reflector or concentrator, under given radiation input intensity conditions, are greatly increased as compared with prior similar devices.

The invention will be discussed hereafter primarily as applied to solar furnaces. In the usual solar furnace, the radiation collected by the device is focused onto a suitable radiation absorber in highly concentrated form to raise the temperature thereof. The absorber may be a suitable black body, or a black body equivalent such as a cavity. In a cavity construction, the concentrated radiation enters the cavity through a small opening, and is substantially entirely absorbed by the walls of the cavity.

One type of efficiency loss which has occurred in prior solar furnaces has resulted from the emission of reradiation by the absorber, that is, even though a particular cavity or other absorber may have been very efficient in absorbing substantially all of the radiation which was initially collected from the sun, there has usually been a considerable loss of energy in the form of reradiation by the absorber after it becomes heated. This reradiation is completely lost from the system, and acts as a limiting factor preventing the attainment of as high a temperature as might otherwise be reached by the absorber.

The apparatus of the present invention is designed to prevent the loss of the discussed reradiation energy, and to return that energy to the absorber without substantial loss, so that the reradiation energy itself may act to further increase the temperature of the absorber. This result is achieved by the use of a unique radiation returning mirror structure, which is so located as to receive at least a portion of the reradiation emitted from the absorber, and to reflect that radiation directly back to the absorber. As viewed from the absorber, the radiation return mirror structure occupies a portion of the same half space which contains the primary radiation collecting mirror or other concentrator, and may for best results occupy substantially all of that half space which is left unoccupied by the main concentrator, to prevent the loss of any reradiation energy through any area which is not necessarily left open because of the concentrator. Where the main concentrator is annular, the reradiation return mirror structure may take the form of two separate mirrors, one of which occupies the angle within the annular concentrator (as viewed from the absorber), while the other return mirror occupies the angular area about the annular concentrator, again as viewed from the absorber.

The above and other features and objects of the present invention will be better understood from the following detailed description of the typical embodiments illustrated in the accompanying drawing, in which:

FIG. 1 is an axial section through a first form of solar furnace or the like constructed in accordance with the invention; and FIGS. 2 and 3 are similar views representing two variational forms of the invention.

Referring first to FIG. 1, the solar furnace 10 there shown includes a main reflector 11 serving as the radiation concentrator of the system, for receiving parallel rays 12 from the sun or another similar source and focusing those rays at a spot defined by the opening or mouth 13 of a radiation absorbing cavity 14. The heat and light rays 12 coming from the sun may be considered as directed parallel to a main axis 15 of the furnace, with reflector 11 having a specularly reflective surface at 16 which is preferably of parabolic axial section, centered about axis 15. It will of course be apparent that if some energy source other than the sun is utilized for providing the incoming radiation 12, the rays 12 may not be exactly parallel, but may converge or diverge as they approach mirror 11, which mirror should then be ellipsoidal (diverging rays) or hyperboloidal (converging rays). Also, the energy may have been reflected one or more times by planar or other mirrors before assuming the illustrated orientation of advancement toward mirror 11 along lines 12 or the like.

The cavity 14 is defined by a wall 17 of a suitable opaque material having an inner surface 18 capable of very effectively absorbing substantially all radiation which strikes that surface. The material of wall 17 is continuous about the entire cavity except at the location of opening 13, which lies essentially in a transverse plane 19 disposed perpendicularly to the main optical axis 15. As will be apparent, cavity 14 is desirably circular and symmetrical about axis 15, so that its axial sectional configuration in all planes is the same as that illustrated in FIG. 1. As examples of the material of which cavity 14 may be formed, this element may typically be constructed of pyrolitic graphite or thoria. Also, when the cavity is at high temperature, it preferably is continuously rotated or spun about the optical axis 15 at a rate sufficient to prevent sagging of the material of wall 17 as a result of the temperatures. Such spinning of the cavity may be produced by a motor typically represented at 20, mounted on a stationary support 21, and having its shaft 22 connected to and carrying the cavity.

After cavity 14 has been raised to a high temperature by the radiation reflected by element 11, the cavity itself commences to function as a radiation emitting body, serving to emit radiation leftwardly from opening 13. For this purpose, the cavity may be considered as the equivalent of an emissive black body located at the position of opening 13, and functioning to emit radiation from this location throughout the entire half space to the left of plane 19. Thus, the reradiation energy flares out in all directions from opening 13 through the 180° half space bounded on the right by plane 19, with the center of radiation being considered for simplicity as the point 23 at the center of opening 13 and positioned on axis 15. The reradiation emitting from opening 13 within the annular region occupied by main reflector 11 (as viewed from opening 13) advances toward the reflector until it hits reflective surface 16 and is then reflected by that surface back along the lines defined by arrows 12 to return to the initial source of the basic radiation. The other reradiation emitting from opening 13 of the cavity is received by two auxiliary mirrors 24 and 25 and is reflected by those mirrors directly back toward opening 13, to reenter the cavity through that opening and assist in maximizing the highest temperature attainable in the cavity. As will be apparent from a consideration of FIG. 1, the mirror 24 receives and reflects energy at a location about mirror 11, as viewed from opening 13, while the second auxiliary mirror 25 returns radiation from a location within the interior of annular mirror 11, again as viewed from opening 13. Together, the two mirrors 24 and 25 preferably occupy the entire half space to the left of plane 19, as viewed from opening 13, with the exception of that portion occupied by main reflector 11.

Mirrors 24 and 25 are centered about axis 15, with mirror 24 being annular and mirror 25 being circular. Both mirrors are curved essentially spherically about the opening 13, in order to assure that any radiation emitting from opening 13 and impinging against the inner reflective surface 26 of mirror 24, or surface 27 of mirror 25, will be reflected directly back along the same path toward opening 13, as indicated by the arrows 28. In this way, substantially all of the radiation energy which strikes surfaces 26 and 27 is returned to the cavity, except for such energy as may be lost in the form of heat at reflectors 24 and 25, and result in raising the temperatures of these reflectors. To minimize this type of loss, the inner reflectorized surfaces 26 and 27 are formed of aluminum, silver or other highly specularly reflective material. Also, the temperatures of mirrors 24 and 25 may be kept at a minimum by passing a cooling fluid through heat transfer coils 29 and 30 secured to mirrors 24 and 25 in heat transferring relation therewith. Fluid is pumped through these coils by two pumps 31, taking suction from reservoirs 32, to which the heated fluid from coils 29 and 30 returns after passing through cooler 33. All of these parts are of course purposely kept out of the annular path 34 which radiation 12 follows in passing to reflector 11, and are kept out of the path 35, which the focused radiation follows in passing from reflector 11 to opening 13.

For best results, the reflective surfaces of the two mirrors 24 and 25 should take the form of ellipsoids of revolution, with the foci of the meridinal sections of these ellipsoids being located substantially at the effective location of absorber 14, that is, at opening 13. Best return of the reradiation to opening 13 is attained when the two foci are located within the circle defined by opening 13, with the ideal situation being one in which the two foci are located at the extremes of the corresponding meridinal diameter of the effective absorber area (opening 13). With reference to FIG. 1, this means for example that mirror 24 may for optimum results have its reflective surface defined by an ellipsoid of revolution one of whose meridinal sections is illustrated at 134, with the two foci of this meridinal section being located at the extremes 35' and 36 of the corresponding meridinal diameter of opening 13. For simplicity of construction, a special type of ellipsoid of revolution may be employed, consisting simply of a sphere centered about point 23 on axis 15. Such a sphere will return substantially all of the reradiation to opening 13, though not as optimally as in the case of an ellipsoid of revolution having its two foci at points 35' and 36, rather than coincident at the point 23. The above discussed structural characteristics of mirror 24 of course apply also to mirror 25, and will not be discussed in detail as applied to that mirror.

To now summarize briefly the manner of operation of the apparatus of FIG. 1, assume that radiation from the sun is approaching the illustrated apparatus along the lines 12, and impinges upon mirror 11 to be focused thereby onto the effective absorbing area defined by opening 13 of the cavity type absorber 14. This highly concentrated radiation enters the cavity and is trapped therein, and acts to rapidly raise the temperature of the cavity to a very high value approaching that of the source (the sun). Motor 20 may be in operation at this time to prevent collapse of the cavity 14; and any material which is to be studied at high temperature, or for any reason is to be raised to a high temperature, may be present in the cavity 14 for heating. Some of the energy reradiated from inner surface 18 of the cavity, as a result of the high temperature of the cavity, will be able to find its way to and through opening 13, and emit from that opening throughout the half space to the left of plane 19. The portions of this radiation which are within the two regions defined by mirrors 24 and 25 impinge against the inner reflective surfaces of those mirrors and are reflected directly back toward opening 13, on a return path substantially coincident with their initial path, to enter the opening and assist the initial radiation in maintaining or elevating the temperature of the cavity. This process may be repeated many times with the result that the ultimate temperature attained in the cavity is much higher than that attainable in conventional solar furnaces without the use of the reradiation return mirrors 24 and 25.

FIG. 2 represents another form of the invention which may be considered as identical with that of FIG. 1 except as to the positioning of the two reradiation return mirrors 24a and 25a. Specifically, in FIG. 2, the mirror 24a (corresponding to mirror 24 of FIG. 1) may be located radially outwardly of and about annular path 34a which the radiation 12a from the sun or other source follows in passing to primary concentrating mirror 11a. Also, the second reradiation return mirror 25a may in this case be located closer to opening 13a of cavity 14a than is mirror 25 of FIG. 1. The function of the FIG. 2 arrangement is the same as in FIG. 1, and attains the same advantageous results.

To illustrate mathematically the very substantial gains in efficiency achieved by use of mirrors 24 and 25 (or 24a and 25a) or only one of these mirrors if desired, the following mathematical proof is given.

For the purposes of this derivation, the terms used are defined as follows:

$T$ is the specific intensity of radiation leaving the target area;

$S'$ is specific intensity of radiation entering the target area from the primary focuser;

$E_p$ is defined as the "specific exposal" of the target area (opening 13) to the primary focuser 11 (see Equation 2 below);

$E_T$ is the specific exposal of opening 13 to mirrors 24 and 25 combined;

$E$ is the specific exposal of opening 13 to the entire half space centered on axis 15 and to the left of plane 19;

$r_T$ is the reflectivity of the mirrors 24 and 25;

$\theta$, a running variable, is the angular deviation of a point on one of the reflectors 11, 24, 25 from the axis of revolution as seen from the point 23;

$\theta_0$ is the rim angle between axis 15 and the periphery of mirror 25 (and the inner edge of mirror 11);

$\theta_1$ is the rim angle between axis 15 and the periphery of mirror 11 and inner edge of mirror 24;

$\pi/2$ is the angle between axis 15 and the outer edge of mirror 24 (all angles being as seen from point 23), Using the above notations, it is first of all noted that:

$$S'E_p + Tr_T E_T = TE \qquad (1)$$

$$E_p = \int_{\theta_0}^{\theta_1} 2\pi \sin\theta \cos\theta\, d\theta = \pi(\sin^2\theta_1 - \sin^2\theta_0) \qquad (2)$$

$$E_T = \int_0^{\theta_0} 2\pi \sin\theta \cos\theta\, d\theta + \int_{\theta_1}^{\pi/2} 2\pi \sin\theta \cos\theta\, d\theta$$

$$= \pi[\sin^2\theta_0 + 1 - \sin^2\theta_1] \qquad (3)$$

$$E = \int_0^{\pi/2} 2\pi \sin\theta \cos\theta\, d\theta = \pi \qquad (4)$$

Substituting 2, 3, and 4 in Equation 1, we find that without supplemental mirrors 24 and 25:

$$T/S' = \sin^2\theta_1 - \sin^2\theta_0$$

Whereas with the supplemental mirrors:

$$T/S' = \frac{E_p}{1 - r_T E_T} = \frac{\sin^2\theta_1 - \sin^2\theta_0}{1 - r_T(1 + \sin^2\theta_0 - \sin^2\theta_1)}$$

FIG. 3 represents a third form of the invention in which the main radiation concentrator is a lens 11b, substituted for the mirror 11 or 11a of the first two forms of the invention. In FIG. 3, the rays from the sun or other energy source approach lens 11b along the paths represented by arrows 12b, and are focused by the lens into the opening or mouth 13b of cavity 14b. Energy is reradiated from the cavity throughout the half space to the right of plane 19b (this plane being disposed transversely of optical axis 15b). The portion of this half space which is not occupied by lens 11b (as seen from opening 13b) is occupied by an annular radiation return mirror 24b which is constructed, positioned and cooled in accordance with the teachings discussed above in connection with mirrors 24, 25, 24a and 25a. Thus mirror 24b acts to return to the cavity all of the reradiated energy which would otherwise be emitted from the cavity within the portion of the half space which is located radially outwardly of lens 11b.

I claim:

1. A furnace comprising a radiation absorber, a radiation concentrator for receiving radiation from a source and directing it in concentrated form to said absorber to be absorbed by and heat the latter, said absorber being constructed when heated to emit reradiation within at least a portion of a half space at one side of the absorber, said concentrator occupying a first region of said half space as seen from the absorber, and two reradiation returning specular reflectors occupying two additional regions of said half space as viewed from the absorber and constructed to receive some of said reradiation within said two additional regions and reflect it specularly and preferentially back to the absorber and along generally the reverse of the path followed by the reradiation from said absorber to said reflector means, said concentrator and one of said reflectors being annular, said first region being located angularly between said second and third regions as viewed from the absorber.

2. A furnace comprising a cavity type radiation absorber, a radiation concentrator in the form of a radiation reflecting mirror structure for receiving radiation from a source and directing it in concentrated form to said absorber to be absorbed by and heat the latter, said absorber being constructed when heated to emit reradiation throughout substantially the entire angular extent of a half space at one side of the absorber, said concentrator occupying a first region of said half space as seen from the absorber, and two reradiation returning specular reflectors occupying two additional regions of said half space as viewed from the absorber and constructed to receive some of said reradiation within said two additional regions and reflect it specularly and preferentially back to the absorber and along generally the reverse of the path followed by the reradiation from said absorber to said reflector means, said concentrator and one of said reflectors being annular, said first region being located angularly between said second and third regions as viewed from the absorber, said three regions occupying together substantially said entire half space, said reradiation returning reflectors taking the form essentially of portions of spheres centered about the effective location of said absorber.

3. Apparatus comprising a radiation absorber, a radiation concentrator which is substantially symmetrical circularly about an axis and is constructed to receive radiation from a source and direct it in concentrated form to a predetermined focal spot essentially on said axis, said absorber having a target portion located essentially on said axis and essentially at said focal spot at a location to receive said radiation directly from said concentrator and absorb it, said target portion of the absorber being constructed to emit reradiation within at least a portion of a half space at one side thereof, said concentrator occupying a first region of said half space as seen from said target portion and reradiation returning specular reflector means occupying a second region of said half space and containing an axial opening through which said concentrator is visible as viewed from said target portion of the absorber, said reradiation returning reflector means extending about said axis and having a predetermined return reflection focal center which is located at said focal spot of the concentrator and at the location of said target portion of the absorber so that reradiation received by said reflector means from said target portion is reflected specularly back to said target portion at said focal center and along generally the reverse of the path followed by the reradiation from said absorber to said reflector means.

4. Apparatus as recited in claim 3, including means for cooling said reradiation returning reflector means.

5. Apparatus as recited in claim 3, including means for conducting a cooling fluid in heat transferring relation with said reflector means to cool the latter.

6. Apparatus as recited in claim 3, in which said concentrator is in the form of a radiation reflecting mirror structure.

7. Apparatus as recited in claim 3, in which said absorber is a cavity having an opening at said target portion thereof.

8. Apparatus as recited in claim 3, in which said concentrator is a lens structure.

9. Apparatus comprising a radiation absorber, a radiation concentrator which is substantially symmetrical circularly about an axis and is constructed to receive radiation from a source and direct it in concentrated form to a predetermined focal spot essentially on said axis, said absorber having a target portion located essentially on said axis and essentially at said focal spot at a location to receive said radiation directly from said concentrator and absorb it, said target portion of the absorber being constructed to emit reradiation within at least a portion of a half space at one side thereof, said concentrator occupying a first region of said half space as seen from said target portion, and reradiation returning specular reflector means occupying a second region of said half space and containing an axial opening through which said concentrator is visible as viewed from said target portion of the absorber, said reradiation returning reflector means taking the form essentially of a portion of an ellipsoid of revolution which is substantially symmetrical circularly about said axis and has its center located at said focal spot of the concentrator and at said portion of the absorber and is constructed to receive some of said reradiation from said portion of the absorber and reflect it specularly back to said portion of the absorber and along generally the reverse of the path followed by the reradiation from said absorber to said reflector means.

10. Apparatus as recited in claim 9, in which said ellipsoid of revolution is a sphere.

11. Apparatus as recited in claim 9, in which said ellipsoid of revolution has the foci of its meridinal sections positioned substantially at the location of said target portion of the absorber.

12. Apparatus comprising a radiation absorber, a radiation concentrator which is substantially symmetrical circularly about an axis and is constructed to receive radiation from a source and direct it in concentrated form to a predetermined focal spot essentially on said axis, said absorber having a target portion located essentially on said axis and essentially at said focal spot at a location to receive said radiation directly from said concentrator and absorb it, said target portion of the absorber being constructed to emit reradiation throughout substantially the entire angular extent of a half space at one side thereof, said concentrator occupying a first region of said half space as seen from said target portion, and reradiation returning specular reflector means occupying the rest of said half space and having a portion containing an axial opening through which said concentrator is visible as viewed from said target portion of the absorber, said portion of the reradiation returning reflector means extending about said axis and having a predetermined return reflection focal center which is located at said focal spot of the concentrator and at the location of said target portion of the absorber so that reradiation received by said portion of the reflector means from said target portion is reflected specularly back to said target portion at said focal center and along generally the reverse of the path followed by the reradiation from said absorber to said reflector means.

References Cited by the Examiner

UNITED STATES PATENTS

| | | | |
|---|---|---|---|
| 291,146 | 1/1884 | Calver | 126—271 |
| 980,505 | 1/1911 | Emmet | 126—271 |
| 1,599,481 | 9/1926 | Marcuse | 126—271 |
| 1,661,473 | 3/1928 | Goddard et al. | 126—271 |
| 1,704,173 | 3/1929 | Chesney | 126—271 X |
| 3,085,565 | 4/1963 | Macauley | 126—270 |

JAMES W. WESTHAVER, *Primary Examiner.*